US010711597B2

(12) United States Patent
Wheeler et al.

(10) Patent No.: US 10,711,597 B2
(45) Date of Patent: Jul. 14, 2020

(54) POWER TRANSMISSION AND COMMUNICATION BETWEEN PROCESSORS AND ENERGY INDUSTRY DEVICES

(71) Applicants: Adam Wheeler, Oakland, CA (US); Stephen Coulston, Houston, TX (US); Paul Halstead, Longmont, CO (US)

(72) Inventors: Adam Wheeler, Oakland, CA (US); Stephen Coulston, Houston, TX (US); Paul Halstead, Longmont, CO (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 454 days.

(21) Appl. No.: 15/158,661

(22) Filed: May 19, 2016

(65) Prior Publication Data

US 2016/0369622 A1    Dec. 22, 2016

Related U.S. Application Data

(60) Provisional application No. 62/183,039, filed on Jun. 22, 2015.

(51) Int. Cl.
*E21B 47/12*  (2012.01)
*H04B 3/54*  (2006.01)

(52) U.S. Cl.
CPC .............. *E21B 47/12* (2013.01); *H04B 3/542* (2013.01); *H04B 3/548* (2013.01);
(Continued)

(58) Field of Classification Search
CPC ............ E21B 47/12; H04B 2203/5408; H04B 2203/5475; H04B 3/542; H04B 3/548
(Continued)

(56) References Cited

U.S. PATENT DOCUMENTS 4,695,840 A * 9/1987 Darilek ............... E21B 33/0355
340/10.33
5,289,560 A * 2/1994 Abney ..................... H02P 7/29
318/608
(Continued)

OTHER PUBLICATIONS

Ahmed et al., "Assessment of Borehole Telemetry Components (TASK VI)", University of Oklahoma, Mar. 24, 2014, pp. 1-43.
(Continued)

*Primary Examiner* — Nader Bolourchi
(74) *Attorney, Agent, or Firm* — Cantor Colburn LLP

(57) ABSTRACT

An embodiment of a method of communicating between a surface processing unit and an energy industry tool includes: receiving a power signal from a power source at an integrated interface device of a communication and processing system, the communication and processing system located between a surface processing unit and an energy industry tool, the interface device including a processor and a variable output power supply; receiving a communication at the processor from a surface processing unit; transmitting a control signal from the processor to the variable output power supply, the control signal including a series of pulses having a duty cycle that is varied to cause the power supply to generate a modulated direct current (DC) output signal having at least one of a frequency and an amplitude that is modulated according to a communication protocol to represent the communication; and transmitting the modulated output signal to a tool.

20 Claims, 4 Drawing Sheets

(52) U.S. Cl.
CPC ................ *H04B 2203/5408* (2013.01); *H04B 2203/5412* (2013.01); *H04B 2203/5475* (2013.01)

(58) Field of Classification Search
USPC ...................................................... 340/854.9
See application file for complete search history.

(56) References Cited

U.S. PATENT DOCUMENTS

| | | | |
|---|---|---|---|
| 8,066,076 B2 | 11/2011 | Donald et al. | |
| 8,373,418 B2 | 2/2013 | Davey | |
| 2010/0052940 A1* | 3/2010 | Hesbol | H04B 3/54 340/850 |
| 2010/0289547 A1* | 11/2010 | Crofts | H03K 7/08 327/175 |
| 2012/0026003 A1* | 2/2012 | Layton | G01V 11/002 340/854.9 |
| 2013/0033383 A1* | 2/2013 | Coulston | E21B 47/12 340/854.9 |

OTHER PUBLICATIONS

International Search Report and Written Opinion for PCT Application No. PCT/US2016/034028, dated Sep. 1, 2016, pp. 1-12.

\* cited by examiner

POWER TRANSMISSION AND COMMUNICATION BETWEEN PROCESSORS AND ENERGY INDUSTRY DEVICES

CROSS REFERENCE TO RELATED APPLICATIONS

This application claims the benefit of an earlier filing date from U.S. Provisional Application Ser. No. 62/183,039 filed Jun. 22, 2015, the entire disclosure of which is incorporated herein by reference.

BACKGROUND

In hydrocarbon exploration operations, subsea and land-based systems are used to explore formations, drill boreholes, perform formation measurements and perform various other operations. A variety of tools or devices, such as sensors, fluid flow control devices and electronic units are typically deployed at surface and/or borehole locations to facilitate such operations. Hardware devices such as interface cards may be incorporated to allow for transmission of power and communication between surface processors and energy industry devices.

SUMMARY

An embodiment of a method of communicating between a surface processing unit and an energy industry tool includes: receiving a power signal from a power source at an integrated interface device of a communication and processing system, the communication and processing system located between a surface processing unit and an energy industry tool, the interface device including a processor and a variable output power supply; receiving a communication at the processor from a surface processing unit; transmitting a control signal from the processor to the variable output power supply, the control signal including a series of pulses having a duty cycle that is varied to cause the power supply to generate a modulated direct current (DC) output signal having at least one of a frequency and an amplitude that is modulated according to a communication protocol to represent the communication; and transmitting the modulated output signal to a tool.

An embodiment of an interface assembly for communicating between a surface processing unit and an energy industry tool includes: a variable output power supply circuit attached to a substrate, the variable output power supply circuit configured to receive a power signal from a power source; and a processor including circuitry attached to the substrate, the processor configured to receive a communication from a surface processing unit. The processor is configured to: transmit a control signal to the variable output power supply circuit, the control signal including a series of pulses having a duty cycle that is varied to cause the variable output power supply circuit to generate a modulated direct current (DC) output signal having at least one of a frequency and an amplitude that is modulated according to a communication protocol to represent the communication; and transmit the modulated output signal to a tool.

BRIEF DESCRIPTION OF THE DRAWINGS

The following descriptions should not be considered limiting in any way. With reference to the accompanying drawings, like elements are numbered alike.

DETAILED DESCRIPTION

Embodiments described herein include components of a data communication and power system for, e.g., energy industry operations, such as downhole, subsea and/or surface operations. An embodiment of an electronic power and communication interface includes an interface assembly configured to transmit communications and data between a surface processing unit and a downhole or surface tool over a power line used to provide power to the tool. The interface assembly includes a variable output power supply and a processor. The processor is configured to modulate output power signals from the power supply to transmit communications and/or data over a power line to the tool using the output power signals. The interface assembly may be any type of integrated component, such an interface card for use in subsea and/or wellhead systems.

Figure 1:
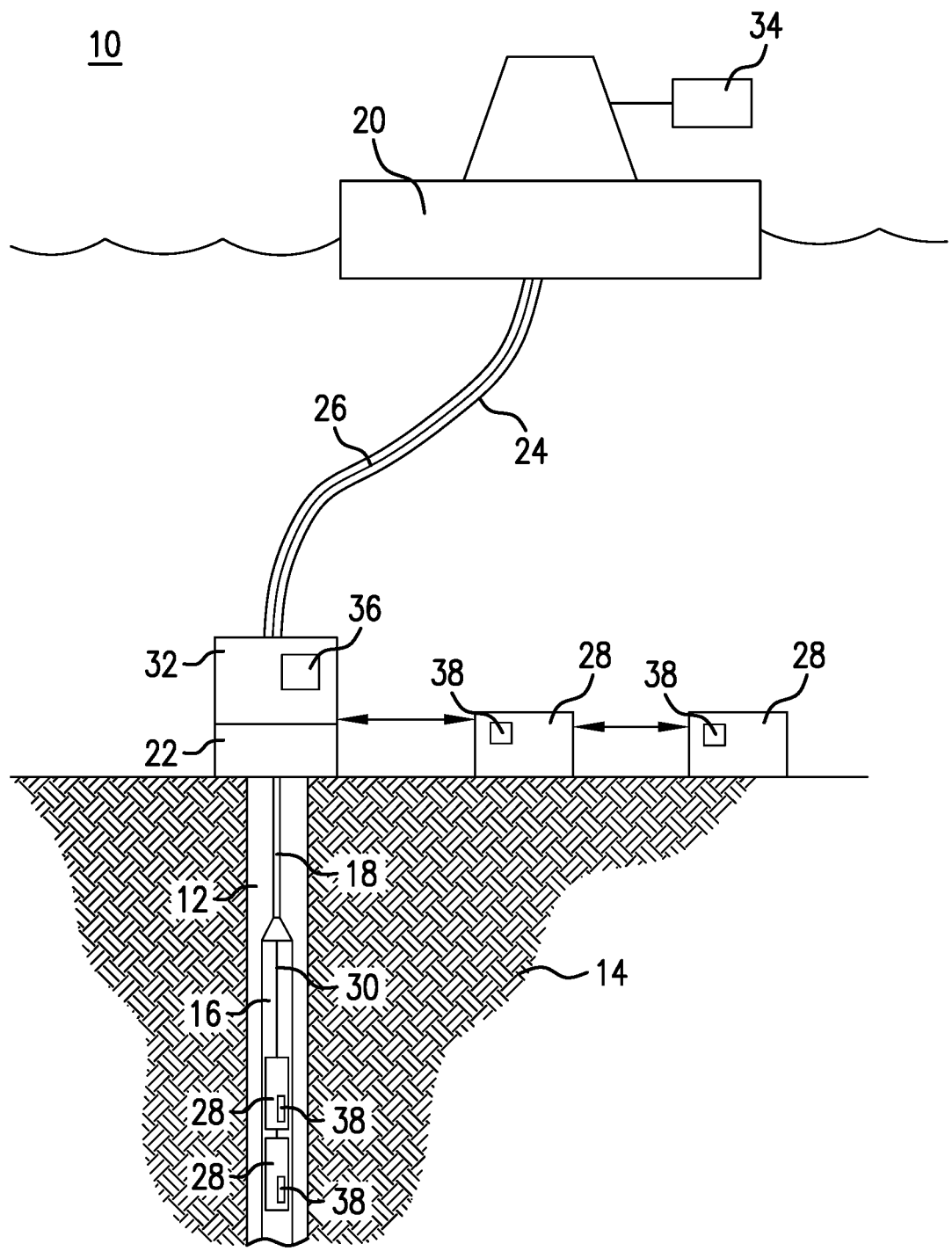
FIG. 1 depicts an embodiment of a system for performing energy industry operations.

FIG. 1 illustrates an exemplary embodiment of a system 10 for performing energy industry operations such as drilling a borehole 12 in an earth formation 14, formation measurement and/or evaluation, hydrocarbon production, completion and/or stimulation. The borehole 12 may be an open borehole, a cased borehole, or have both cased and open sections. The system 10 includes a borehole string or tool string 16 configured to deploy an assembly of downhole components in the borehole 12. The downhole components may be deployed using any suitable carrier, such as the borehole string 16, a drill string, a wireline 18, and/or a completion and production string. The wireline 18 may include one or multiple conductors for providing signal communications and electrical power to the assembly. A "carrier" as described herein means any device, device component, combination of devices, media and/or member that may be used to convey, house, support or otherwise facilitate the use of another device, device component, combination of devices, media and/or member. Exemplary non-limiting carriers include coiled tubing, drill strings of the coiled tube type, of the jointed pipe type and any combination or portion thereof. Other carrier examples include wirelines, wireline sondes, slickline sondes, drop shots, downhole subs, bottom-hole assemblies, and drill strings.

In one embodiment, the system 10 is configured to perform energy industry operations in a subsea environment, i.e., an environment where an earth formation is located under a body of water. For example, the system 10 includes a surface facility 20 such as one or more platforms and/or marine vessels. The surface facility 20 is connected to a subsea wellhead 22 that includes components for transmitting power and communications between the surface facility 20 and downhole and/or subsea surface components. The wellhead 22, downhole components and/or subsea components are connected to the surface facility 20 via one or more risers 24. A riser 24 may include a communication link such as a communication cable 26 for transmitting power and communications. The riser 24 may include or be incorporated as a communication and/or production riser or conduit. Although embodiments are described herein in the context of subsea systems, they are not so limited. The devices, systems and methods described herein may be incorporated in land-based systems and operations.

Any number of downhole and/or subsea tools 28 or components may be deployed in the borehole, including, for example a number of sensors, control devices, electronic devices, drilling assemblies, stimulation assemblies, pumps, etc. Various sensing or measurement devices may be included in the system 10, in downhole and/or surface locations. For example, one or more parameter sensors (such as gauges, permanently installed gauges and/or sensor assemblies such as LWD subs) are configured for formation evaluation measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), and sensors for measuring borehole fluid parameters (e.g., viscosity, density, clarity, rheology, pH level, and gas, oil and water contents). It is noted that the use of the term "tool" is intended to encompass any device or component that can be deployed downhole, on the surface or subsea and communicate with a processor located at the surface and/or a wellhead component.

One or more tools 28 are connected to the wellhead 22 by a power and communication link 30, which includes components such as electrical conductors and/or optical fibers. In one embodiment, the link includes at least one conductor configured to transmit electrical power to the tool(s) 28. The link, in the embodiment shown in FIG. 1, is configured as a power line 30, but is not so limited. The link may include any number or type of conductor or communication component. Other types of communication links that could be included include telemetry systems such as mud pulse telemetry systems. In this embodiment, the power line 30 is a cable or other conduit such as tubing encapsulated conductor (TEC) that connects electrical conductors to the wellhead 22 via the wireline 18.

A communication and processing system 32, such as a subsea control system module (SCM), is coupled to or connected to the wellhead 22, and includes components for relaying or transmitting power, data and communications between the tools 28 and a surface processing unit 34. In one embodiment, the communication and processing system 32 includes a control unit or other control components to control aspects of an energy industry operation (e.g., control injection and/or production pressures and flow rates and/or control operation of one or more tools 28). The communication and processing system 32 may include a variety of components for facilitating energy industry operations, such as processors, switches, valve, pumps and others.

The communication and processing system 32 includes an interface assembly 36 that supplies power to one or more tools over the power line 30. The interface assembly 36 also includes components configured to transmit data from a processor or surface control system (e.g., the surface processing unit 34) over a tool's power line using, e.g., frequency and/or current modulation to communicate with various tools 28. The interface assembly 36 may also be able to interpret and decode any communications sent from electronic units 38 located either in each tool 28 or connected to one or more tools 28, and transmit the communications to the surface processing unit 34 if desired. As shown in FIG. 1, the interface assembly 36 is incorporated in the subsea communication and processing system 32, but is not so limited and can be used with any type of device or system that requires interfacing to transmit power and data communications.

The interface assembly 36 also includes an on-board processor (e.g., central processing unit, control unit or module) that controls the power and communication components. In one embodiment, the interface assembly 36 is an interface card or other hardware device configured to be used with the communication and processing system 32 or other system that facilitates communication between processing devices and tools. Various communication and power components, including an on-board processor and a variable power supply, may be incorporated into a single or integrated device or platform, such as a circuit board or multi-chip module.

The surface processing unit 34, subsea communication and processing system 32, interface assembly 36 and tools 28 include components as necessary to provide for storing and/or processing data. Exemplary components include, without limitation, at least one processor, storage, memory, input devices, output devices and the like.

Figure 2:
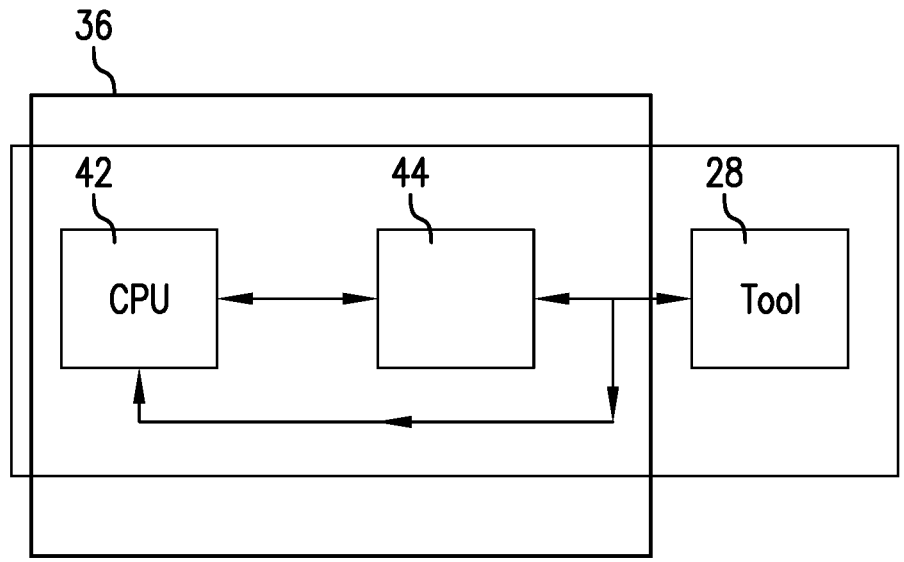
FIG. 2 depicts an embodiment of an interface assembly for transmitting power and communications between a processor and one or more tools.

FIG. 2 illustrates an embodiment of the interface assembly 36. The interface assembly 36 incorporates components such as a processor 42 (e.g., a central processing unit, control module or other processing unit or device) and a variable output power supply 44 such as a direct current (DC) output power supply. The bilateral arrows indicate that there exists a means of communication, measurement and/or control of some kind between each respective block. A separate power source provides the necessary input power to the interface assembly 36.

The processor 42 is configured to periodically or continuously monitor the output voltage and current from the variable power supply 44 to each tool 28. Analog measurements of the output voltage and current are sampled and converted into a digital signal that is input to the processor 42. The processor 42 either encodes communications from the surface processing unit 34 and modulates the output from the variable output power supply 44 to transmit communications to the tool 28, or decodes the digital signal based on modulations generated by or for the tool 28 to transmit communications to the surface processing unit 34.

Figure 3:
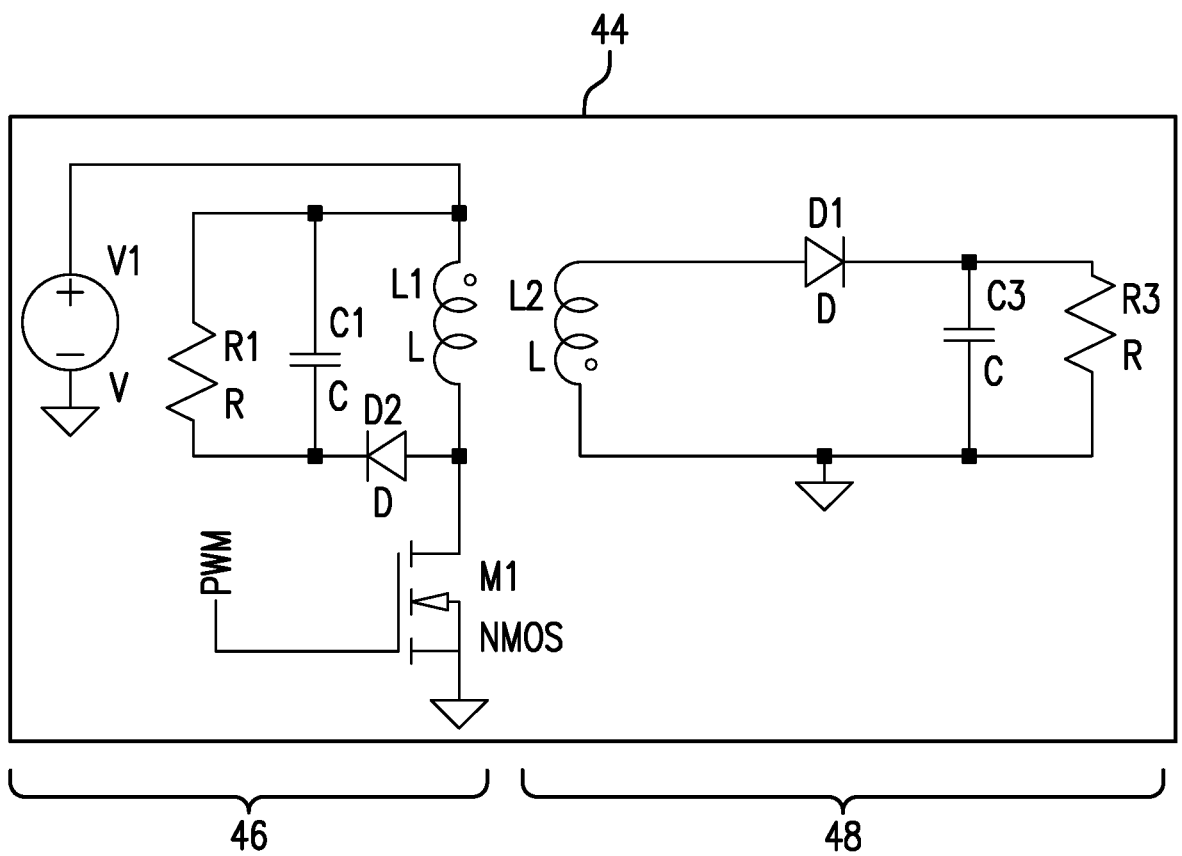
FIG. 3 is a circuit diagram illustrating aspects of an embodiment of a variable output power supply of the interface assembly of FIG. 2.

FIG. 3 shows an embodiment of a variable output power supply 44. In this embodiment, the power supply 44 is a flyback converter. A flyback converter is an isolated switch mode power supply that is capable of taking an input voltage and outputting a higher or lower voltage. A flyback converter is similar to a buck-boost converter, but has an inductor of a buck-boost converter replaced with a transformer. The variable output power supply, in one embodiment, receives an alternating current (AC) or direct current (DC) input and produces a DC output.

The transformer of the variable output power supply 44 in this embodiment has at least two windings: a primary winding (L1) that is part of a primary circuit 46 connected to a power source (V1), and one or more secondary windings (L2) that are part of a secondary circuit 48 that is connected to the power line of a tool 28. The windings L1 and L2 have no direct conducting path between each other, which restricts current to 'flow' only within its respective side of the transformer. Each side of the transformer (i.e., circuits 46 and 48) has its own ground potential since current cannot directly flow from one side to the other, effectively creating two separate electrical systems. This separation of electrical systems is called Galvanic isolation. Instead of current flowing through a direct conduction path, energy is stored in the transformer and transferred from the primary winding L1 to the secondary winding L2 via magnetic flux in the transformer.

There are two operating states that the flyback converter goes through in continuous conduction mode. The convention used herein to describe these two states is 'on' and 'off'. The power supply 44 is said to be 'on' if a primary side switch (M1), which in this embodiment is a MOSFET (metal oxide semiconductor field effect transistor), is conducting current through the primary side winding L1, and 'off' when the primary side switch M1 is open. The switch M1 has a high switching frequency capability so that a power signal across the windings can be pulsed at a sufficient frequency to generate communication signals within (or carried on) the power signal.

The switch M1 may be turned on and off via a control signal from the processor 42 according to a selected modulation or activation scheme. One such scheme is pulse width modulation (PWM).

When the switch M1 is conducting (the 'on' state), voltage on the primary transformer winding L1 ramps up very quickly to equal the input voltage from the power source V1, completing the primary side circuit 46. This causes the primary side current and magnetic flux to increase, the latter of which stores energy in the transformer. A diode D1 on the secondary circuit 48 side is reverse biased, preventing the flow of current in the secondary circuit 48 due to the induced voltage being negative.

When the power supply 44 is in the 'on' state, a capacitor (C3) on the secondary side must supply all energy to the output load of the circuit (e.g., a tool 28, represented as R3 in FIG. 3) during steady state operation. As the energy across the capacitor C3 is transferred to the load, the capacitor's voltage begins to decrease.

When the switch M1 is open (the power supply 44 is in the 'off' state), conduction is prevented on the primary side. The stored magnetic flux will induce a current on the secondary causing energy to transfer to the secondary. This will create a positive voltage which allows the diode D1 to become forward biased, allowing current to flow through the secondary circuit 48. The energy from the transformer core now charges capacitor C3 (which supplies energy to the output during the 'on' state mentioned above) in preparation for the next 'on' cycle. This cycle repeats as soon as the primary side switch M1 is turned on again.

The voltage output from the secondary circuit (due to the capacitor C3 continually charging and discharging) is a modulated voltage signal having an oscillating waveform. The waveform may be a sinusoidal waveform referred to as an alternating current (AC) ripple.

The AC ripple or waveform represents a periodic variation in the direct current (DC) output of the variable power supply 44. The average magnitude or amplitude value of the output signal (e.g., the AC ripple voltage) is referred to herein as the DC component of the output signal. The DC component of the output voltage may be used to drive power on the power line to one or more tools. The tool(s) will then begin to operate and communicate as designed.

To generate the modulated voltage signal, the switch M1 is periodically closed and opened. The period of time during which the switch M1 is closed is referred to as a "pulse". The percentage of time where the switch M1 is closed (i.e., conducting) in one switching period is referred to as a "duty cycle". The duty cycle directly affects the output voltage of the Flyback converter, as it controls the length of time that the converter is in the 'on' state previously mentioned. Generally, the larger the duty cycle, the higher the output DC component.

The duration of time that the switch M1 conducts, i.e., the duty cycle, is controlled by a processor in the interface assembly according to a modulation protocol, such as a pulse width modulation (PWM) protocol.

Figure 4:
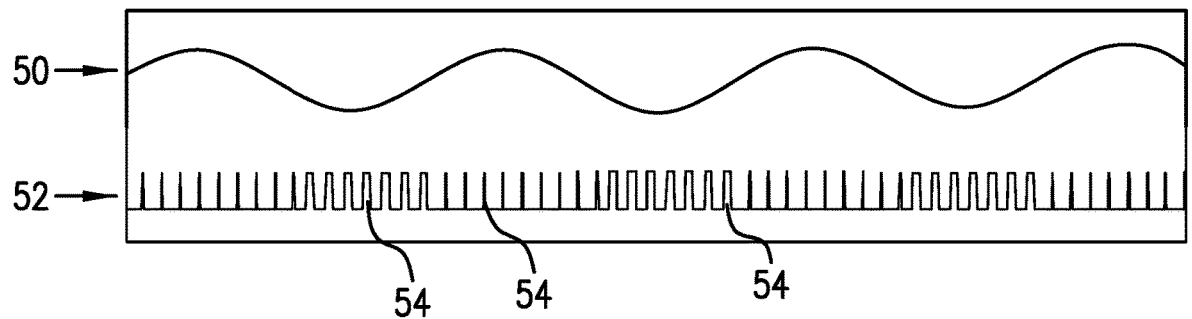
FIG. 4 depicts examples of a modulated power signal.

FIG. 4 illustrates an exemplary pulse pattern and a corresponding output voltage signal produced by PWM. In this example, output voltage signal 50 has a magnitude that oscillates according to a sinusoidal wave pattern having a modulated frequency. The output voltage signal 50 is generated by periodically turning on the power supply according to a pulse pattern 52. The time between the beginning of a pulse 54 and the beginning of a subsequent pulse is referred to as a "period", and the percentage of the period (i.e., the ratio between the duration of the pulse and the period) during which the power supply is activated is the duty cycle. The number of periods as a function of time is referred to as the pulse modulation frequency.

As shown in FIG. 4, the modulated frequency of the power signal is much lower than the pulse modulation frequency, and is dependent on changes in the duty cycle. In this embodiment, the duty cycle is changed in a step-wise pattern, and the power signal is filtered to produce the output voltage signal. In one embodiment, the output voltage is transmitted to a filter that smoothens out the signal by the filter circuit's capacitor. The filter may be configured to smooth the signal so that the change in magnitude is at a minimum required for the tool to detect an edge of each wave.

These sinusoidal waveforms are carried on a power line including a conductor that connects to the tool, for example a tubing-encapsulated conductor (TEC). In this way, the interface assembly provides power to the tool while also providing the ability to carry communications on top of the DC component (as the DC component that powers the tool is the average between the peaks of this sine wave below).

The duty cycle can be varied to modulate the frequency of the output signal according to any suitable modulation scheme or communication protocol. For example, the pattern of pulses 54 can be varied by varying the period and/or duty cycle to create an output waveform having a variation in frequency and/or amplitude that represents communications.

For example, the duty cycle can be varied to create waveforms at different frequencies. This allows a communication protocol to be established by setting a bit period (the amount of time that is allotted for one bit to be transmitted) and determining two modulated frequencies to represent a logical high and low. One method of changing a wave's frequency to represent a binary data communication method is called frequency shift keying (FSK). Other communication protocols may include varying the amplitude of the oscillating waveform, e.g., by varying the pulse period, to represent binary or other data symbols. For example, the output signal amplitude is modulated (e.g., having two or more discrete amplitudes) to generate the pattern of pulses. One amplitude modulation method that may be used is an amplitude shift keying (ASK) method.

The ability to dynamically control the pulse pattern (e.g., PWM pattern) as described herein ensures a stable power supply while allowing the interface assembly to send and/or receive communications via a power signal. As indicated above, the pulse pattern can be selected so that the variation in the output signal and frequency is minimized (i.e., a minimum detectable by the tool), which further maintains stability of the power supplied to the tool.

Figure 5:
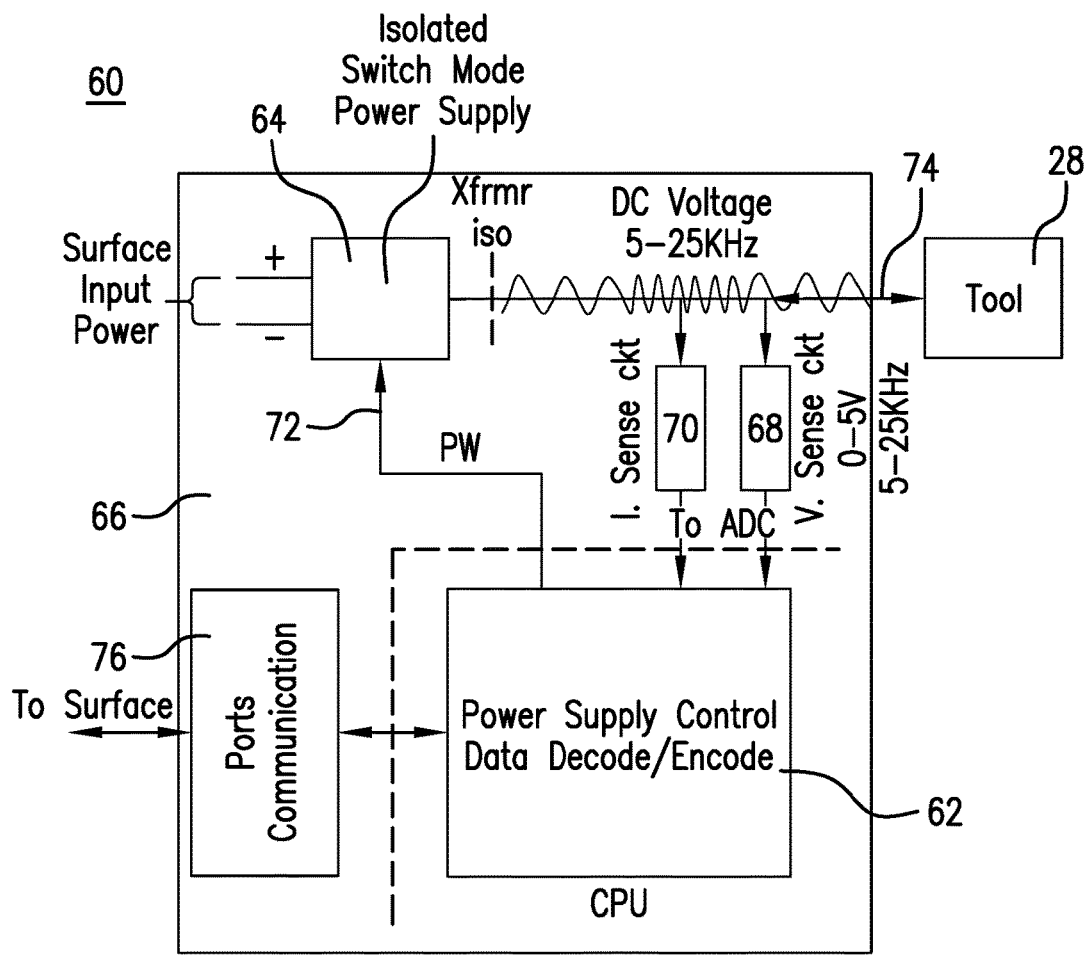
FIG. 5 depicts an example of an interface assembly

FIG. 5 shows an example of the interface assembly. In this example, the interface assembly is configured as an interface card 60 that may be removable from a control system or other system used to connect processors to devices or tools.

The interface card 60 includes a CPU 62 connected to a variable output power supply 64. The power supply 64, which in this example is an isolated switch mode power supply such as a flyback converter circuit, receives control signals having a selected pulse pattern from the CPU 62 and outputs a power signal on which data and/or communication signals are transmitted to a tool 28. At least the power supply 64 and the CPU 62 are disposed on a single hardware support structure 66, such as a printed circuit board (PCB). In this example, the support structure is an interface card. It is noted that the isolated switch mode power supply and/or flyback converter is exemplary, as the power supply is not limited to the embodiments described herein and may be any type of power supply or circuit that is capable of outputting a variable voltage and/or current.

The CPU, power supply and other components may be attached or otherwise incorporated into any suitable electronic package, such as a multi-chip module. For example, both the CPU 62 and the power supply 64 are circuits printed on a common substrate, e.g., circuit board as part of an interface assembly package.

In one embodiment, the CPU 62 includes memory and circuitry to store and execute instructions for monitoring the power supply 64, encoding the power supply output signal and/or decoding signals from the tool 28. The instructions may be provided as a software program or application stored in the CPU 62.

Other components that may be incorporated into the interface include a voltage sensing circuit 68 and/or a current sensing circuit 70. The circuits 68 and/or 70 allow the CPU 62 to monitor output signals from the variable power supply 64 and control the power supply 64 (e.g., by turning a switch in the primary circuit on and off) using a control signal 72 (e.g., a PWM signal). Modulated output signals are transmitted over a power line conductor 74 to the tool 28. The power line conductor 74 may be used by the tool 28 to send communication signals to the interface card 60. The CPU 62 can receive communications from a processor (e.g., the surface processing unit 34) and transmit communications to the processor via a communication port 76.

Figure 6:
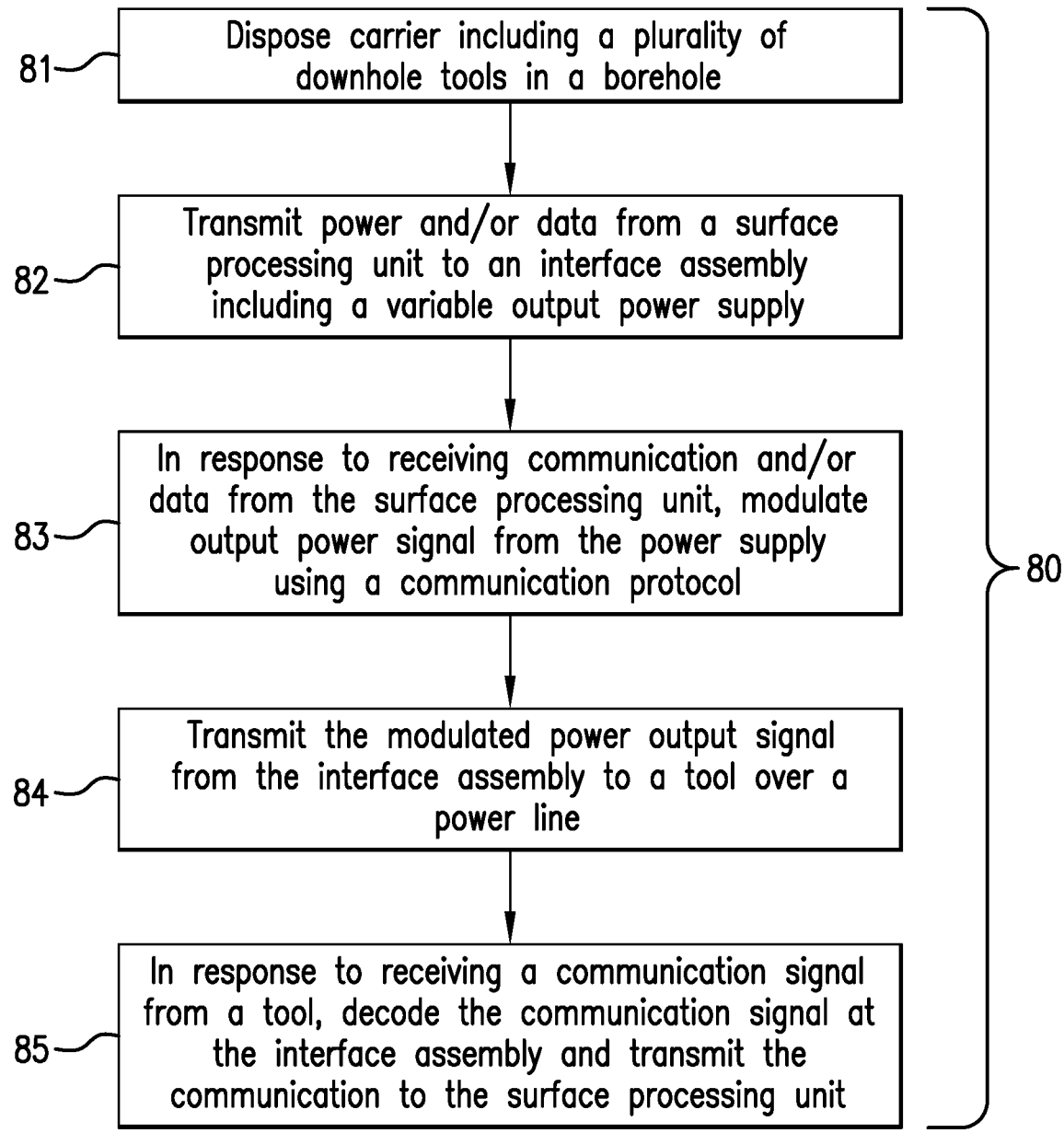
FIG. 6 is a flow chart depicting an embodiment of a method of transmitting power and communications between a processor and one or more energy industry devices.

FIG. 6 illustrates a method 80 of transmitting power and communications between processors and devices. The method 80 is described in conjunction with a system for energy industry operations which includes one or more processors and one or more energy industry tools. In one embodiment, the method 80 is performed using the system 10 and an interface assembly such as the interface assembly 36 and/or the interface card 60. However, the method 80 is not so limited and may be performed in conjunction with any device, group of devices or system in which power and communications are transmitted between components.

The method 80 includes one or more of stages 81-85 described herein. In one embodiment, the method includes the execution of all of stages 81-85 in the order described. However, certain stages may be omitted, stages may be added, or the order of the stages changed.

In the first stage 81, a carrier such as the borehole string 16 including one or more tools 28 is disposed in a borehole, and/or one or more tools 28 are disposed on a subsea or on-land surface.

In the second stage 82, electrical power is transmitted from a power source (e.g., located at or coupled to the surface facility 20) to a tool 28, or a plurality of tools 28 such as a tool string or network of tools. Data including information, requests, commands, control signals and/or other communications are transmitted to an interface assembly, such as the interface card 60.

In the third stage 83, in response to receiving communication and/or data signals from, e.g., the surface processing unit 34, the processor generates a control signal including a pulse pattern having a periodic variation of the pulse period and/or duty cycle. This control signal modulates the frequency and/or amplitude of the variable power supply output signal (e.g., a DC output signal) according to a selected communication protocol.

The duty cycle and/or period of the control signal may be selected so that the amplitude or frequency variation of the modulated output signal is at a minimum that can be detected by the tool. In one embodiment, the duty cycle is selected to generate the minimum modulated frequency value detectable by the tools.

For example, the CPU 62 receives (e.g., via a suitable filter) a communication signal from the surface processing unit 34, samples and decodes the communication signal, and generates a control signal 72. The control signal 72 is transmitted to a variable output power supply, e.g., the flyback converter 64 or other isolated switch mode power supply. The control signal 72 is a pulse signal having a variable (step-wise or gradual/chirped) duty cycle that is varied according to a FSK or other protocol. For example, a first pattern of duty cycles is selected that will generate an output signal having a first frequency (e.g., representing "one") and a second pattern is selected that will generate an output signal having a second frequency (e.g., representing "zero"). The control signal provides a series of these patterns that represent a binary string. Various patterns can be selected as desired to generate frequency and/or amplitude changes that represent other symbols or single pulses, and are not limited to the embodiments described herein.

In the fourth stage 84, the modulated power output signal is transmitted from the interface assembly to the tool 28, e.g., from the flyback converter 64 to the tool 28 over the power line conductor 74.

The tool 28 includes processing and transmission components sufficient to allow the tool 28 to receive the power output signal and decode communications and/or data signals based on the output signal's modulation pattern.

In the fifth stage 85, in response to receiving a communication signal from a tool, the interface assembly decodes the communication signal and transmits the corresponding communication and/or data to the surface processing unit.

For example, the tool 28 returns an analog signal over the power line conductor 74 using a modulation pattern, such as a FSK modulation. The analog signal is sampled via the sensing circuit 68 and/or the sensing circuit 70, and transmitted via a high speed analog to digital converter (ADC) and one or more filters into the CPU 62.

In one embodiment, the current and voltage on the power line 74 measured by the circuits 68, 70 and passed through an analog signal filter, such as a Bessel filter. The Bessel filter preserves the shape of the input signal as it passed through the filter, which is highly desirable when using FSK communications. The filter is designed to only allow the frequencies used in the FSK protocols to pass through. This frequency range is called the passband, while the minimum or maximum frequency at which the circuit is designed to 'ignore' or block is called the cut-off frequency (i.e. a low-pass filter with a cut off frequency at 20 kHz will only pass frequencies of less than 20 kHz).

After being sampled and passed through the Bessel filter, the signals are input into a high speed analog to digital converter (ADC). The ADC's purpose is to convert these signals from the sensing circuits 68, 70 from the analog to digital realm for decoding and processing. The ADC digitizes the analog measurements and sends them to the CPU 62 to be demodulated and interpreted.

The CPU can then transmit the data and/or communication resulting from the interpretation from the tool 28 through a conductor to a surface system. It is noted that the sensing circuits 68, 70 and associated filters can also be used by the CPU 62 to monitoring the power output signal transmitted from the flyback converter 64 to the tool 28.

In one embodiment, for multiple tools connected via the power line, each tool 28 is assigned a different time delay so that each tool 28 can differentiate its own signal. Also, the time delay can be used to allow for the interface assembly to detect individual tool communications and/or responses.

The systems and methods described herein provide various advantages over prior art techniques. The systems and methods described herein allow for a reduced footprint and corresponding assembly size relative to prior art devices (e.g., by using fewer components and circuits), provide capability for handling multiple types of modulation (e.g., current and frequency shift keying), allow for the supply of a range of DC output voltages using a single hardware component and/or a single power supply circuit. Other advantages include the ability to perform continuous modulation, and the ability to employ a software control scheme rather than a hardware control scheme The embodiments described herein can be used to incorporate power and communication interface functionality into a smaller package than is possible or feasible in the prior art. For example, an interface card or other hardware device includes fewer components and represents a smaller footprint than prior art devices. Typical interface devices include multiple power supplies (e.g., "stacked" power supplies) that require more material, higher complexity and greater size than the interface assembly embodiments described herein.

Subsea applications present significant challenges with respect to obsoleting legacy gauge equipment. For example, once an interface card is installed in a subsea control module (SCM), the interface card can be very difficult and expensive to change out. This is a serious concern for both customers who want gauges to work with these SCMs for long periods of time, and for manufacturers that develop and supply new gauge technology. Embodiments described herein address this challenge by providing for an interface card or other hardware device that is capable of supporting multiple downhole gauge communication protocols, relieving the need for multiple interface cards or devices.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of communicating between a surface processing unit and an energy industry tool, comprising:
    receiving a power signal from a power source at an integrated interface device of a communication and processing system, the communication and processing system located between the surface processing unit and the energy industry tool, the interface device including a processor and a variable output power supply;
    receiving a surface communication at the processor from the surface processing unit;
    transmitting a control signal from the processor to the variable output power supply, the control signal including a series of pulses having a duty cycle that is varied to cause the variable output power supply to generate a modulated direct current (DC) output signal having at least one of a frequency and an amplitude that is modulated according to a communication protocol to represent the surface communication; and
    transmitting the modulated DC output signal from the interface device that includes the variable output power supply directly to the energy industry tool.

2. The method of claim 1, wherein at least the variable output power supply and the processor are incorporated in a single hardware device that is removable from the communication and processing system.

3. The method of claim 1, wherein the modulated DC output signal has a magnitude that is approximately equal to a smallest value that is detectable by the tool.

4. The method of claim 1, wherein the modulated DC output signal is modulated according to a frequency shift keying (FSK) protocol.

5. The method of claim 1, wherein the modulated DC output signal is modulated according to an amplitude shift keying (ASK) protocol.

6. The method of claim 1, wherein the amplitude of the control signal is modulated to generate a pulse train including the series of pulses, each pulse having a constant amplitude.

7. The method of claim 6, wherein the processor is configured to generate the series of pulses by operating a switch connected to an output of the variable output power supply according to a selected pulse pattern.

8. The method of claim 1, wherein the modulated DC output signal forms an oscillating waveform, the waveform having a frequency generated by periodically actuating the variable output power supply according to a selected pulse pattern, the modulated DC output signal providing both power and communication to the tool.

9. The method of claim 1, wherein the variable output power supply is an isolated switch mode power supply.

10. The method of claim 1, wherein at least the variable output power supply and the processor are incorporated in a subsea unit connected to a borehole in an earth formation.

11. An interface assembly for communicating between a surface processing unit and an energy industry tool, comprising:
- a variable output power supply attached to a substrate, the variable output power supply configured to receive a power signal from a power source; and
- a processor including circuitry attached to the substrate and configured to receive a surface communication from the surface processing unit, the processor configured to:
- transmit a control signal to the variable output power supply, the control signal including a series of pulses having a duty cycle that is varied to cause the variable output power supply circuit to generate a modulated direct current (DC) output signal having at least one of a frequency and an amplitude that is modulated according to a communication protocol to represent the surface communication; and
- transmit the modulated DC output signal from the variable output power supply directly to the energy industry tool.

12. The interface assembly of claim 11, wherein at least the variable output power supply and the processor are incorporated in a single hardware device that is removable from the communication and processing system disposed between the surface processing unit and the energy industry tool.

13. The interface assembly of claim 11, wherein the modulated DC output signal has a magnitude that is approximately equal to a smallest value that is detectable by the energy industry tool.

14. The interface assembly of claim 11, wherein the modulated DC output signal is modulated according to a frequency shift keying (FSK) protocol.

15. The interface assembly of claim 11, wherein the modulated DC output signal is modulated according to an amplitude shift keying (ASK) protocol.

16. The interface assembly of claim 11, wherein an amplitude of the control signal is modulated to generate a pulse train including the series of pulses, each pulse of the series of pulses having a constant amplitude.

17. The interface assembly of claim 16, wherein the processor is configured to generate the series of pulses by operating a switch connected to an output of the variable output power supply according to a selected pulse pattern.

18. The interface assembly of claim 11, wherein the modulated DC output signal forms an oscillating waveform, the waveform having a frequency generated by periodically actuating the variable output power supply according to a selected pulse pattern, the modulated DC output signal providing both power and communication to the tool.

19. The interface assembly of claim 11, wherein the variable output power supply is an isolated switch mode power supply.

20. The interface assembly of claim 11, wherein at least the variable output power supply and the processor are incorporated in a subsea unit connected to a borehole in an earth formation.

* * * * *